United States Patent [19]

Saxe

[11] Patent Number: 5,237,451
[45] Date of Patent: Aug. 17, 1993

[54] BEAM SHAPING SYSTEM USING DIFFRACTION

[75] Inventor: Steven G. Saxe, St. Paul, Minn.

[73] Assignee: Minnesota Mining and Manufacturing Company, St. Paul, Minn.

[21] Appl. No.: 971,675

[22] Filed: Nov. 4, 1992

Related U.S. Application Data

[63] Continuation of Ser. No. 895,190, Jun. 5, 1992, abandoned, which is a continuation of Ser. No. 439,094, Nov. 17, 1989, abandoned.

[51] Int. Cl.$^5$ .................. G02B 5/18; G02B 27/44
[52] U.S. Cl. .................... 359/565; 359/571; 359/574
[58] Field of Search ........... 350/162.16, 162.2, 162.22, 350/420, 421, 452, 3.71, 3.72, 96.12; 369/110, 112; 359/15, 19, 565, 569, 571, 574

[56] References Cited

U.S. PATENT DOCUMENTS

| | | | |
|---|---|---|---|
| 3,658,402 | 4/1972 | Nishida et al. | 350/3.86 |
| 4,355,858 | 10/1982 | Funato et al. | 350/3.72 |
| 4,733,943 | 3/1988 | Suzuki et al. | 359/565 |
| 4,779,259 | 10/1988 | Kono et al. | 369/112 |
| 4,779,943 | 10/1988 | Tatsuno et al. | 350/3.72 |
| 4,815,084 | 3/1989 | Scifres et al. | 350/96.12 |
| 4,824,191 | 4/1989 | Kato et al. | 350/3.72 |
| 4,832,464 | 5/1989 | Kato et al. | 350/3.72 |
| 4,876,680 | 10/1989 | Misawa et al. | 369/112 |
| 4,881,805 | 11/1989 | Cohen | 350/162.16 |
| 4,904,034 | 2/1990 | Narayan et al. | 350/3.71 |
| 4,936,666 | 6/1990 | Futhey | 350/162.16 |
| 4,937,808 | 6/1990 | Shimada et al. | 350/96.12 |

FOREIGN PATENT DOCUMENTS 1-142604  6/1989  Japan .................. 350/162.16

*Primary Examiner*—Martin Lerner
*Attorney, Agent, or Firm*—Gary L. Griswold; Walter N. Kirn; Stephen W. Buckingham

[57] ABSTRACT

A beam shaping system for an astigmatic light source utilizes two lenses, both having diffractive power. A first lens shapes the beam in a first dimension and a second lens shapes the beam in a second dimension perpendicular to the first.

11 Claims, 3 Drawing Sheets

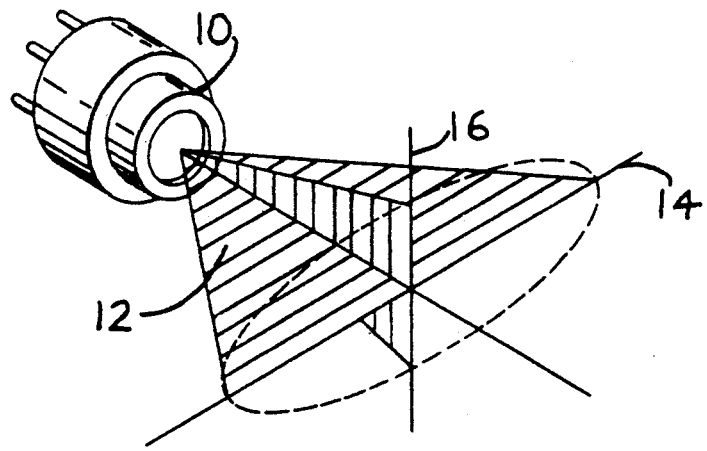
Fig. 1
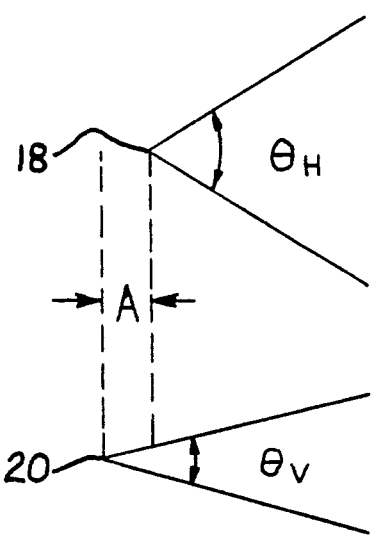
Fig. 2A
Fig. 2B
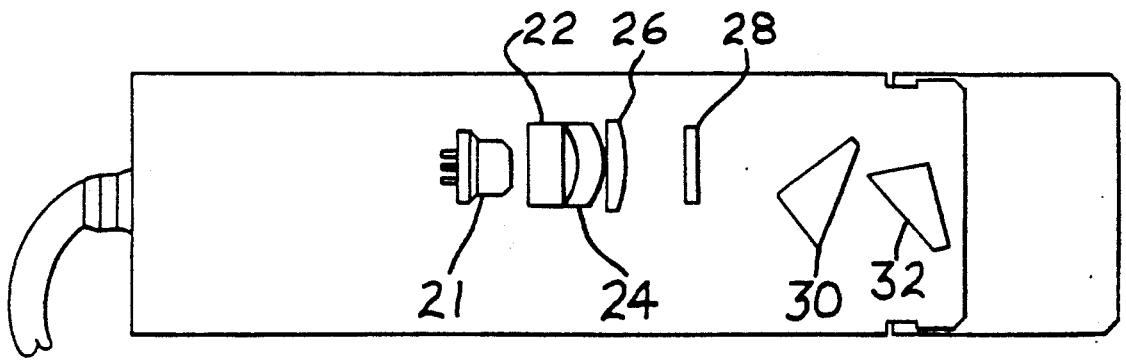
Fig. 3
PRIOR ART

BEAM SHAPING SYSTEM USING DIFFRACTION

This is a continuation of application Ser. No. 07/895,190 filed Jun. 5, 1992 now abandoned which is a continuation of application Ser. No. 07/439,094 filed Nov. 17, 1989, now abandoned.

BACKGROUND OF THE INVENTION

Gas lasers have long been in use as sources of highly-collimated light. Until recently there was little alternative to such lasers when a beam of coherent collimated light was desired. Recently, however, semiconductor diode lasers operating in visible wavelengths have become available. Such lasers offer advantages over the traditional gas discharge lasers, particularly in that they are much smaller in size.

A significant problem with visible wavelength diode lasers when compared with gas lasers is the much lower degree of collimation that they exhibit. This problem is compounded by the fact that the divergence angle will be different in different dimensions, i.e. the beam is elliptical. This is further compounded by the fact that the diode lasers will exhibit astigmatism, that is the apparent origin of the divergence will be different in different dimensions. In order to use such lasers in typical situations, a system for either collimating or focusing the light is required.

SUMMARY OF THE INVENTION

In the present invention a beam shaping system for an astigmatic light source utilizes first and second lenses, each lens having diffractive power. The first lens will shape the lens in a first dimension and the second lens will shape the beam in a second dimension that is perpendicular to the first dimension.

BRIEF DESCRIPTION OF THE DRAWINGS

FIG. 1 is a perspective view showing the typical output beam of a visible wavelength diode laser;

FIGS. 2A and 2B are schematic cross-sectional views showing the astigmatism of a typical visible wavelength diode laser;

FIG. 3 is a side view of a prior art beam shaping system;

DETAILED DESCRIPTION OF A PREFERRED EMBODIMENT

Figure 4:
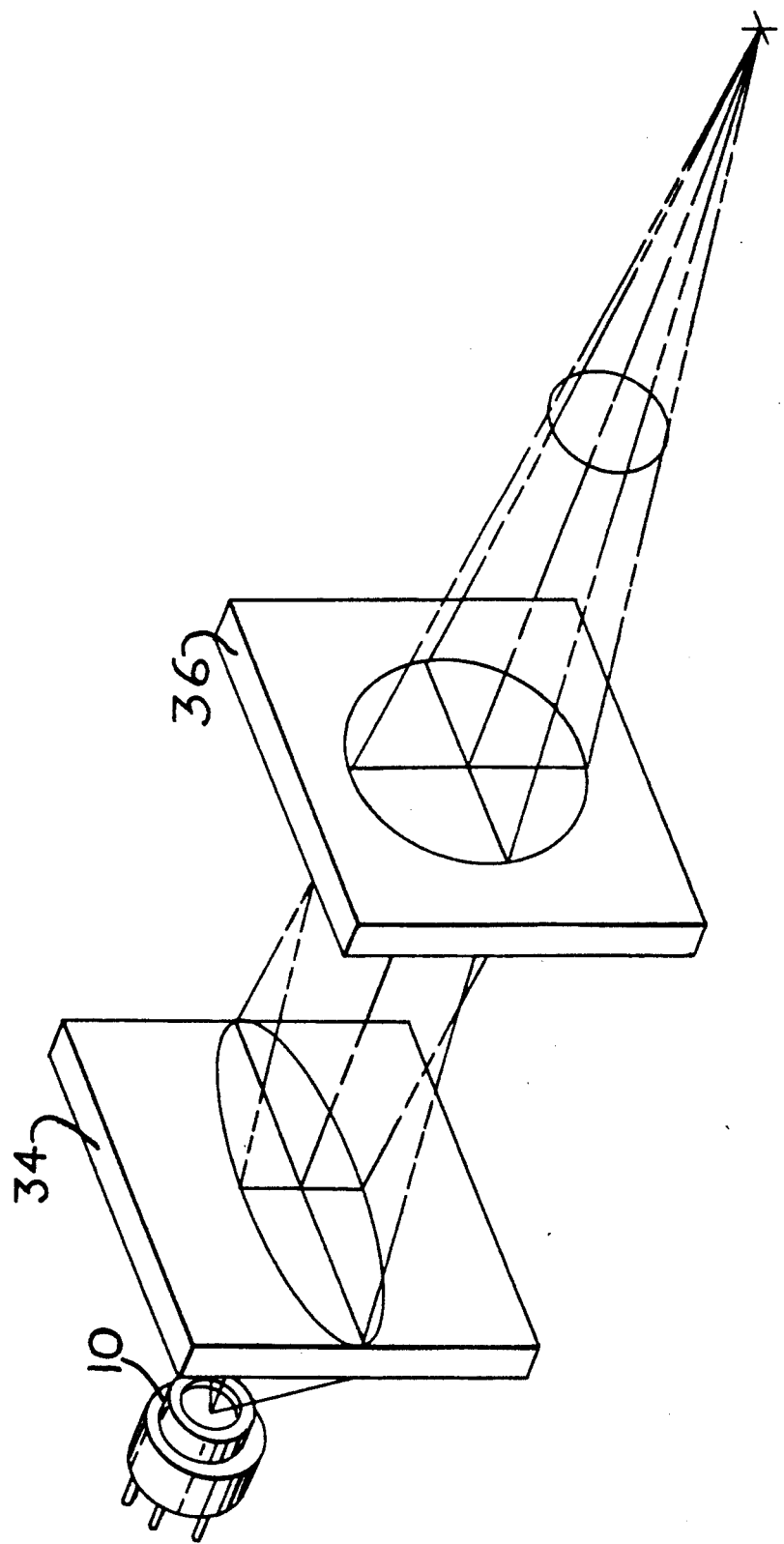
FIG. 4 is a perspective view of a beam shaping system according to the invention.

The present invention will be described in the context of diode lasers operating in visible wavelengths, but those skilled in the art will readily perceive that it is applicable to lasers operating at other wavelengths. Visible wavelengths have been selected because, of diode lasers currently available, the problems of divergence and astigmatism are greater for those producing visible wavelengths. Furthermore the invention could be used with other astigmatic light sources.

FIG. 1 shows an output pattern of a typical diode laser 10. As may be seen, the light output 12 forms an elliptic pattern that is considerably wider along the horizontal axis 14 than the vertical axis 16. It will be appreciated that the use of the terms horizontal and vertical in this context are entirely arbitrary as they may be reversed by rotating the laser 90 degrees.

FIGS. 2A and 2B schematically illustrate the output characteristics of a diode laser. FIG. 2A is a top view of the output beam of the laser of FIG. 1. A typical measure of the spread of such an output is the angle at which the intensity of the output drop to one-half of that on the beam axis. This is known as the full width at half maximum of FWHM. In FIG. 2A the FWHM for the horizontal spread is labeled $\Theta_H$. In a typical diode laser this value would be approximately 30 degrees. Similarly, in FIG. 2B, $\Theta_V$ represents the FWHM for the output of the laser of FIG. 1 along the vertical axis. A typical value for $\theta_V$ would be approximately seven degrees. Additionally, the origins 18 and 20 of the horizontal and vertical divergences are offset by the astigmatic distance, A. A typical value of A in a diode laser is in the range of 20 to 50 μm.

FIG. 3 illustrates a prior art collimator for a laser diode. The overall assembly includes a laser 21; three spherical collimating lenses 22, 24, and 26; a cylindrical lens 28; and two anamorphic prisms 30 and 32. Lenses 22, 24 and 26 collimate the light in the direction having the lesser spread and almost collimate it in the other dimension. As used herein, that is the vertical direction. Lens 28 collimates the light in the horizontal dimension, but leaves the beam elliptical. Prisms 30 and 32 then reshape the light distribution to a circular pattern. The system of FIG. 3 not only is expensive, it is quite bulky. Therefore it largely defeats the size advantage of a diode laser over a gas laser.

An alternative to the structure of FIG. 3 would be to use two refractive cylindrical lenses of differing focal lengths to collimate or focus the light. Unfortunately, this is not practical for several reasons. The required numerical aperture is extremely high, making such lenses impractical. Furthermore such lenses would be bulky, creating additional problems. Because of the bulk of the lenses, it would be difficult to position them as close together as required. Maintaining homogeneity through such a thick lens is difficult as well. Finally a thick lens will absorb more energy from the light passing therethrough. This will result in distortion of the lens due to thermal expansion.

As an alternative to refractive lenses, diffractive lenses could be used. One type of diffractive lens that is especially well suited to laser diode collimation is the type known as a blazed phase zone plate. A blazed phase zone plate has a plurality of diffractive zones each of which has a surface that makes a nonperpendicular angle with the optical axis of the lens and each of the zones is separated from an adjacent zone by an optical step. Such lenses are well suited to the collimation of light from a laser diode. Because diffractive lenses may be very thin, even when the numerical aperture is high, the disadvantages associated with the thickness of refractive lenses are avoided. Additionally only two diffractive elements are required to collimate a laser diode beam compared with the six elements of the refractive system. Furthermore, one of the major disadvantages of diffractive lenses in many situations is the large amount of chromatic aberration occurring since diffraction is a function of wavelength. Since the output wavelength of a laser is strictly controlled, the wavelength that will be used is known in advance and the diffractive lenses may be precisely designed to fit the particular laser with which they will be used.

When discussing diffractive lenses, it should be appreciated that they must be designed to operate with light of a specific wavelength, known as the design wavelength. Furthermore, unlike refractive lenses, they will only operate efficiently on light emerging from a point at a first preselected distance, the front conjugate point, and will bring that light to a focus at a point at a second preselected distance from the lens, the back conjugate point. The distances from the front and back conjugate points to the lens are known as the front and back conjugate distances, respectively.

FIG. 4 shows a diffractive lens system for laser diode collimation. Lens 34 concentrates the light in the horizontal dimension. Lens 36 then concentrates the light in a vertical direction. Lens 35 is positioned such that the beam will be round when it reaches lens 36. Lens 36 is then designed with optical power such that the light will reach its focal point in both the horizontal and vertical directions at the same point. Alternatively, if it were preferred, lens 34 could have its conjugate point at infinity rather that at a finite distance to yield a line focus. Similarly the back conjugate point of lens 36 could be at infinity providing a collimated output rather than bringing the light to a point focus. Alternatively, one or both of the lenses could allow the beam to continue to diverge. Because of the variety of possibilities, the lenses may be said to shape the beam rather than collimate it.

Figure 5:
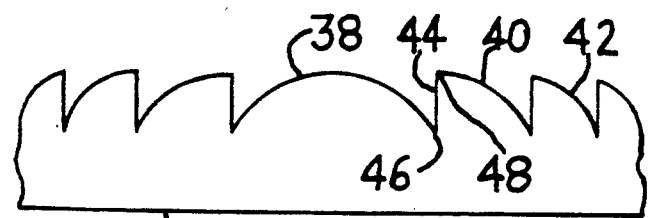
FIG. 5 is a side view of a portion of a lens having diffractive power.

FIG. 5 shows a cross-sectional view of one of the lenses. This lens includes a central diffractive zone 38 and a plurality of additional diffractive zones such as diffractive zone 40 and diffractive zone 42. These zones are linear zones running along the surface of the lens. The contour curvature of the diffractive zones is such that light emerging from the front conjugate point and passing through any point in a zone and then traveling to the back conjugate will have an equal optical path length regardless of the portion of the zone through which it passes. For these purposes, the optical path length is defined to be the sum of the products of the physical path lengths and the associated indices of refraction.

The zones are terminated by optical steps at a position selected such that the total optical path length from the front conjugate point to the rear conjugate point increases by a distance equal to the design wavelength and the bottoms of the steps, such as bottom 46, lie either in a plane or on a cylindrical surface while the tops of the steps, such as top 48, lie along a parallel plane or cylindrical surface. Typically these surfaces would be planes but if it was desired to add refractive power to the diffractive power of the lens, a cylindrical shape could be chosen. The axis of the cylinder could be either parallel on perpendicular to the structures. Additionally refractive power could be added by making smooth surface 49 nonplanar. To a good approximation, each step may have an optical height of $\lambda$, where $\lambda$ is the design wavelength of the lens, and the optical height is defined to be $H \times (n_1 - n_2)$ where H is the physical height of the step, $n_1$ is the index of refraction of the lens material and $n_2$ is the index of refraction of the medium surrounding the lens.

The zone contours themselves are preferably hyperbolic, although in most circumstances a circular curve is a good enough approximation to a hyperbola to provide adequate performance. In many situations, even a straight line approximation to the curves may be used. Those skilled in the art will readily see that the zones farther from central zone 38 will become progressively narrower than those closer to central zone 38. In the present invention, it is desirable that the widths of the lenses be equal to at least twice the FWHM at the distance they are mounted from the diode. This requires that the lens for collimating in the dimension having the greater spread have an extremely high numerical aperture. The result is that the diffractive zones near the edge are so narrow that they are very difficult to manufacture.

Figure 6:
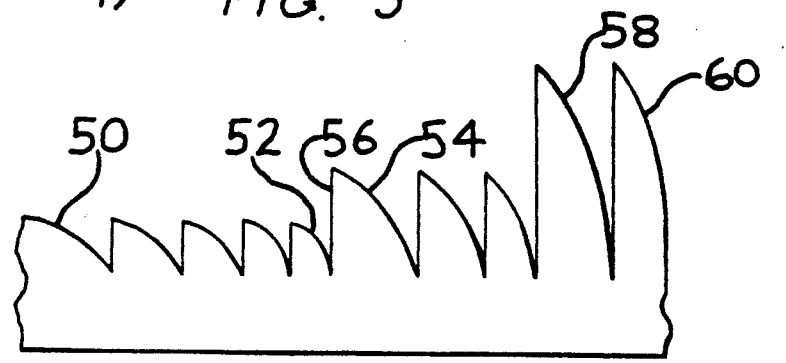
FIG. 6 is a side view of a portion of a lens having diffractive power and utilizing superzones.

FIG. 6 illustrates a design that simplifies the manufacture of such lenses. In the lens of FIG. 6 the zones grow progressively smaller as they move outwardly from central zone 50. Between zone 52 and zone 54, however, optical step 56 has an optical height such that it produces a change in optical path length equal to $2\lambda$. The width of zone 54 is equal to the width of two zones of a lens of the type shown in FIG. 5. Zone 54 is therefore known as a superzone. In addition, superzones 58 and 60 are superzones corresponding to three zones of the type of the lens of FIG. 5. There is no theoretical limit as to how many zones of a FIG. 5 lens to which a superzone may correspond. The number will be determined by the requirements of any particular design. In general, a superzone type lens is defined to be a lens having diffractive power wherein the diffractive power is produced by a plurality of diffractive zones, where the diffractive zones have associated therewith optical steps where at least one of the optical steps produces a change in optical path length of $J\lambda$ and at least one of the optical steps produces a change in optical path length of $K\lambda$ where J and K are unequal integers.

As described, the diffractive zones are formed as structured surfaces. Alternatively, a diffractive lens having smooth surfaces could be formed by bonding together two materials having differing indices of refraction or by doping portions of the lens with a dopant that alters the index of refraction of the lens material. In such a lens the structures would be internal to the lens.

Figure 7:
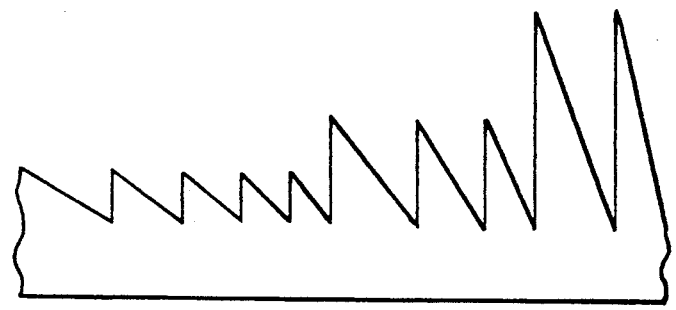
FIG. 7 is a side view of a lens having diffractive power and utilizing superzones and a straight line approximation to the desired zone contours.

FIG. 7 is a cross-sectional view of a lens using a linear approximation to the curved zone contours of FIG. 6. In all other respects the lens of FIG. 7 is the same as the lens of FIG. 6.

Figure 8:
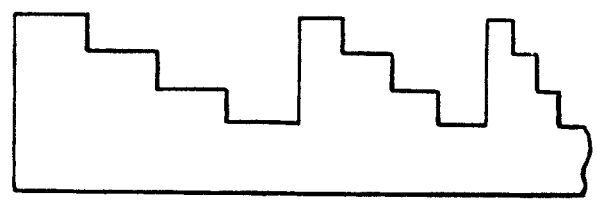
FIG. 8 is a side view of a lens having diffractive power and utilizing a stepwise approximation to the desired zone contours.

FIG. 8 shows a lens utilizing zones whose contours are stepwise approximations to the preferred curves. Such lenses could be produced by a microlithographic process.

All of the lens sets described thus far utilize two separate thin diffractive lenses having linear diffractive zones. Other embodiments are possible, however. For example the two lenses could be provided on opposite faces of a single block. In another alternative embodiment refractive power may be provided in addition to the diffractive power. In such a system the diffractive power and the refractive power of one lens could provide beam shaping in one dimension and aberration correction in the other, while the same functions would be performed by the second lens with the dimensions reversed. A similar effect could be achieved by utilizing zones having a predetermined curvature rather than the linear zones described herein..

EXAMPLE

A set of diode laser beam shaping lenses was designed to work with a diode laser having an output wavelength of 683 nm. The first lens had a front conjugate distance of 3.4641 mm and a back conjugate distance of 506.825 mm. The second lens had a front conjugate distance of 10.289 mm and a back conjugate distance of 500 mm. Each lens was of acrylic plastic having an index of refraction of 1.489 and had superzones corresponding to up to ten conventional zones. The zone contours were linear approximations to the preferred curves. This lens set was designed to produce a circular spot having a diameter of 201 μm where the edge of the spot is defined to be the point at which the light intensity falls to 20 percent of that at the brightest point. The actual spot produced by this lens set was elliptical, having a major axis of 338 μm and a minor axis of 209 μm.

Experimentally it has been determined that the lenses must be positioned extremely precisely to achieve optimum performance. This requirement of precise positioning applies both to translational and rotational positioning.

I claim:

1. A beam shaping system for a diode laser said system having an optic axis along which a light beam emitted by a diode laser travels, said system comprising:
   a first lens means having diffractive power said first lens means intersecting said optic axis and being perpendicular thereto, said first lens means being for shaping said beam in a first dimension, said diffractive power of said first lens means being provided by a plurality of linear diffractive zones, said diffractive zones being separated by optical steps; and
   a second lens means having diffractive power said second lens means intersecting said optic axis and being perpendicular thereto, said second lens means being for shaping said beam in a second dimension, said second dimension being perpendicular to said first dimension, said diffractive power of said second lens means being provided by a plurality of linear diffractive zones said diffractive zones being separated by optical steps.

2. The beam shaping system of claim 1 wherein said diffractive zones of said first lens means being perpendicular to said diffractive zones of said second lens means.

3. The beam shaping system of claim 2 wherein each optical step provides a change in optical path length for said beam equal to $\lambda$, where $\lambda$ is a design wavelength for said system.

4. The beam shaping system of claim 2 wherein some of said optical steps of each lens provide a change in optical path length for said beam equal to $J\lambda$ and some of said optical steps of each lens provide a change in optical path length equal to $K\lambda$, where $\lambda$ is a design wavelength for said system and J and K are unequal integers.

5. The beam shaping system of claim 2 wherein said zones have linear contours.

6. The beam shaping system of claim 5 wherein each optical step provides a change in optical path length of said beam equal to $\lambda$, where $\lambda$ is a design wavelength for said system.

7. The beam shaping system of claim 5 wherein some of said optical steps of each lens provide a change in optical path length for said beam equal to $J\lambda$ and some of said optical steps of each lens provide a change in optical path length equal to $K\lambda$, where $\lambda$ is a design wavelength for said system and J and K are unequal integers.

8. The beam shaping system of claim 2 wherein said zones have hyperbolic contours.

9. The beam shaping system of claim 8 wherein each optical step provides a change in optical path length for said beam equal to $\lambda$, where $\lambda$ is a design wavelength for said system.

10. The beam shaping system of claim 8 wherein some of said optical steps of each lens provide a change in optical path length for said beam equal to $J\lambda$ and some of said optical steps of each lens provide a change in optical path length equal to $K\lambda$, where $\lambda$ is a design wavelength for said system and J and K are unequal integers.

11. The beam shaping system of claim 2 wherein said zones have stepwise contours.

* * * * *